United States Patent [19]

Bredenkamp

[11] 3,987,289

[45] Oct. 19, 1976

[54] ELECTRICAL SIGNAL PROCESSING

[75] Inventor: Gordon L. Bredenkamp, Pretoria, South Africa

[73] Assignee: South African Inventions Development Corporation, Pretoria, South Africa

[22] Filed: May 15, 1975

[21] Appl. No.: 578,052

[30] Foreign Application Priority Data
May 21, 1974 South Africa.................. 74/3246

[52] U.S. Cl. ............................................. 235/152
[51] Int. Cl.² ...................................... G06F 7/38
[58] Field of Search................ 235/152, 151, 150.3

[56] References Cited
UNITED STATES PATENTS

| | | | |
|---|---|---|---|
| 3,372,268 | 3/1968 | Hoernes.......................... | 235/152 X |
| 3,725,897 | 4/1973 | Bleiweiss........................ | 235/151 X |
| 3,862,404 | 1/1975 | Fiedrich........................... | 235/152 |

OTHER PUBLICATIONS

Asynchronous Binary Rate Multiplier Deflection Circuit, R. J. Houldin & L. F. Winter, IBM Technical Disclosure Bulletin, vol. 9, No. 5, Oct. 1966, pp. 478-480.

Primary Examiner—Edward J. Wise
Attorney, Agent, or Firm—Sughrue, Rothwell, Mion, Zinn and Macpeak

[57] ABSTRACT

A method of processing a varying electrical function is disclosed wherein the varying function is related to a series of straight line segments located in end-to-end relationship with each straight line segment closely following a corresponding portion of the varying function and not deviating therefrom by more than a predetermined maximum value. A straight line segment ends and the next successive straight line segment starts at each point where a deviation in excess of the predetermined maximum value occurs. The information on the varying function from time to time as it develops is registered only at each point where a straight line segment ends and the next successive straight line segment starts.

23 Claims, 5 Drawing Figures

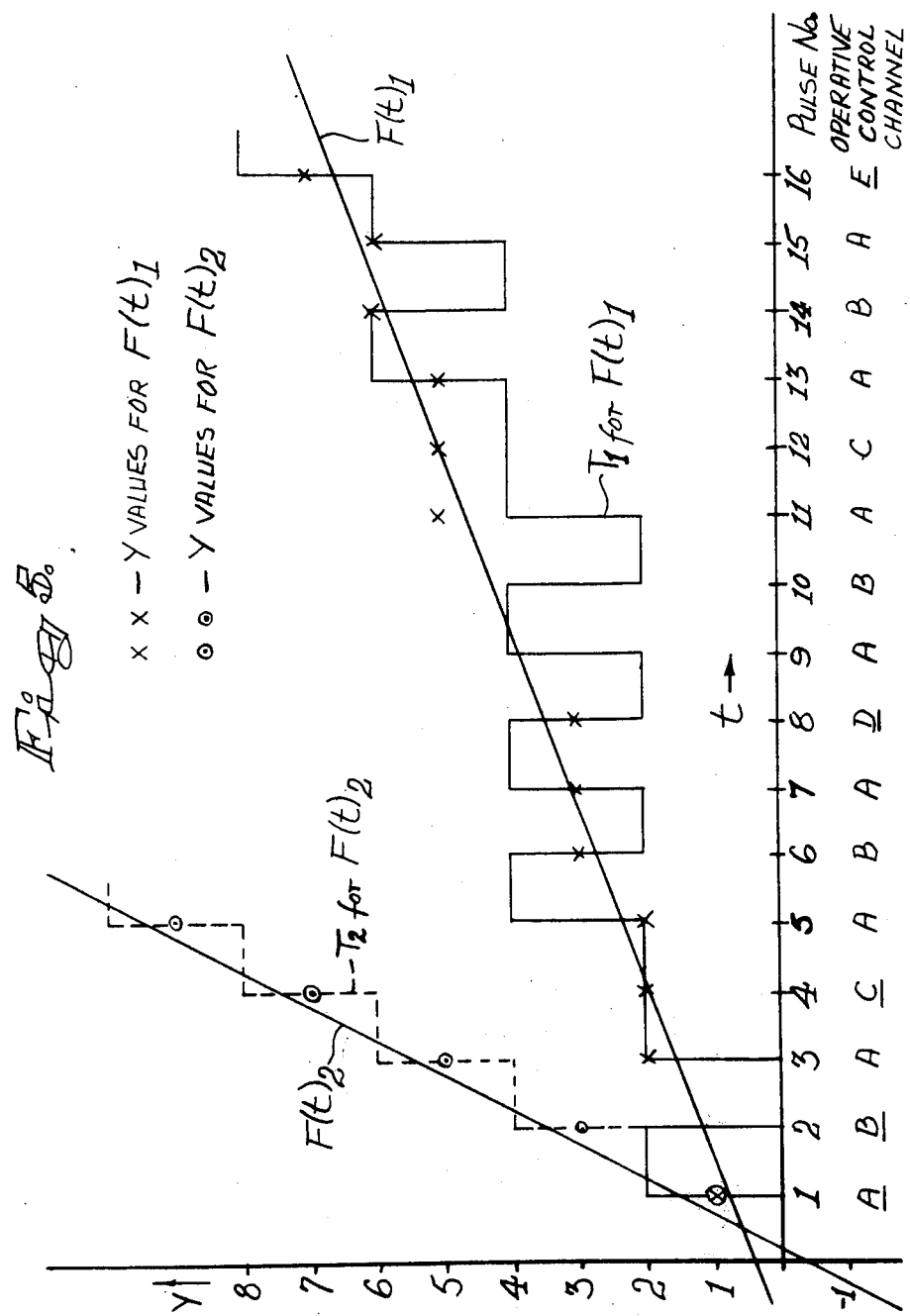

ELECTRICAL SIGNAL PROCESSING

BACKGROUND OF THE INVENTION

This invention relates to electrical signal processing.

Where a digital memory is used to record a varying function, such as, for example, a time varying function, which is to be represented for viewing, such as by being displayed on a cathode ray tube, the independent variable, such as $x$ or time $t$, is usually sampled at fixed and predetermined intervals so that it is not necessary to record the values of the independent variable $x$ or $t$. These values are normally generated artificially at the time of readout by any suitable means, such as a counter or linear ramp. By noting the rate at which the values along the other coordinate, such as $y$-values, were sampled and recorded and also the sequence in which they were stored, it is normally quite easy to reassign an $x$ or $t$-value to each $y$-value as it is read out.

This procedure eliminates the necessity to have an additional memory for the $x$ or $t$-values and would appear to be a very efficient way of recording a function. However, this is only true provided at least 50% of the $y$-values which are recorded represent non-redundant information, namely $y$-values which cannot be estimated from the surrounding $y$-values, such as by a process of interpolation. If more than 50% of the $y$-values recorded are redundant, it would be more advantageous to use half of the memory for storing the $x$ or $t$-values instead of recording at fixed intervals, and only recording so-called non-redundant $y$-values with their corresponding $x$ or $t$-values, since the only purpose served by redundant values when recording at fixed intervals is to indicate the time relation or interval along the $x$-axis between two non-redundant $y$-values.

This can be a very inefficient way of storing this interval and it is accordingly an object of the present invention to provide an improved memory system which is only updated when non-redundant information presents itself.

SUMMARY OF THE INVENTION

According to the invention a method of processing a varying electrical function includes the steps of relating the varying function to a series of straight line segments located in end-to-end relationship with each straight line segment closely following a corresponding portion of the varying function and not deviating therefrom by more than a predetermined maximum value, a straight line segment ending and the next successive straight line segment starting at each point where a deviation in excess of the predetermined maximum value occurs; and registering information on the varying function from time to time as it develops only at each point where a straight line segment ends and the next successive straight line segment starts.

With the arrangement according to the invention, the varying function is related to a series of straight line segments of different slopes and lengths which depend on deviations of the straight line segments from the varying function. Sampled information on the varying function is registered from time to time as the function develops, only at the end of each straight line segment where a deviation of the straight line segment in excess of the predetermined maximum permissible deviation occurs. Information on the varying function is not registered at regular intervals, but only when really necessary at each point where a significant change in slope occurs so that only non-redundant information is recorded. Redundant information on the varying function between the beginning and the end of each straight line segment is not registered.

The registered information may be utilized in any suitable manner, such as being stored for further processing. Where the registered information is stored, the arrangement may be such when the store is full, the oldest information in store is released each time new information becomes available for storage. Registered information may be used to produce a display of the varying function on a cathode ray tube.

More particularly, the method according to the invention includes the steps of comparing the varying function with a reference signal; detecting deviations of the varying function from the reference signal; continually adjusting the reference signal towards correspondence with the varying function; and registering information on the varying function at each point where a deviation of the varying function from the reference signal which is in excess of the predetermined maximum value occurs.

The information on the varying function which is registered may be indicative of the instantaneous value of the varying function at each point where the deviation between the varying function and the reference signal exceeds the predetermined maximum value and/or may be indicative of the interval between the detection of successive deviations in excess of the predetermined maximum value.

The varying function may be compared with the reference signal at intervals, preferably at regular intervals.

Preferably, the reference signal is initially adjusted to correspond with the varying function and thereafter the reference signal is continually adjusted towards correspondence with the varying function.

The reference signal may be adjusted towards correspondence with the varying function by applying control signals dependent on the correspondence or deviation of the varying function from the reference signal; and continually programming the application of the control signals in accordance with detected deviations.

The method according to the invention may be carried out in analogue and/or digital form.

In a preferred embodiment of the invention, a varying function in analogue form is converted into digital form and compared with a digital reference signal which is adjusted continually towards numerical equality with the varying signal whenever a deviation is detected.

The digital reference signal may be derived from a series of substantially uniform pulses.

The digital reference signal may be adjusted towards equality with the digital varying signal by applying to the pulses, control signals dependent on the correspondence or deviation of the varying function with or from the reference signal; controlling the pulse output in accordance with the control signals; adjusting the digital reference signal in accordance with the pulse output; comparing the digital varying function with the digital reference signal; and programming the application of the control signals in accordance with detected deviations.

The digital reference signal may be adjusted by incrementing it algebraically in additive and/or subtractive form.

The pulses may be applied to at least one pulse rate multiplier having a rate input to which the control signals are applicable, the pulse output of the pulse rate multiplier being utilized to increment the digital reference signal and the control signals applied to the rate input to the pulse rate multiplier being programmed continually in accordance with detected deviations.

The pulse rate multiplier may have a plurality of rate input channels to which variable control signals are applicable, the influence of the rate input channels on the pulse output of the pulse rate multiplier differing progressively from channel to channel and the control signals being varied in accordance with detected deviations of the varying function from the reference signal to change the pulse output in accordance with the detected deviations.

The pulse rate multiplier may comprise a binary pulse rate multiplier with a plurality of rate input channels to which a binary control signal is applicable and which become operative one at a time during successive pulses with successive rate input channels from a most significant channel to a least significant channel becoming operative progressively less often, a predetermined change in the pulse output of the pulse rate multiplier being produced during a pulse when the binary control signal comprises logical one on the rate input channel which is operative during the pulse in question and no change in the pulse output being produced during a pulse when the binary control signal comprises logical zero on the rate input channel which is operative during the pulse in question.

The rate input channels may become progressively less significant in their influence on the pulse output of the pulse rate multiplier by becoming operative according to the expression:

$$N = 2^{w-1}(2n+1)$$

Where:
N= the number of the pulse from the start of operations at which a particular rate input channel becomes operative.
   n=0,1,2,3,4, .......... etc., and
w= the position of the particular rate input channel relative to the most significant channel in the progressive sequence of decreasing significance.

The value of the binary control signal applicable to each rate input channel may be determined the first time the input channel in question becomes operative during a straight line segment of the varying function and after the value of the binary control signal has been so determined for the input channel in question the value may remain the same for the rate input channel during the remainder of the straight line segment in question.

In practice where a varying function in analogue form is converted into digital form, the varying function will not normally correspond exactly with its quantified digital value at the beginning of each straight line segment to which the varying function is related. This may cause incorrect operation if the reference signal is derived from the pulse output of a single digital pulse rate multiplier.

To overcome this disadvantage, the digital reference signal may be adjusted by pulse outputs from two series of pulses applied to two synchronized binary pulse rate multipliers whose rate input channels are arranged for pairs of corresponding channels to become operative simultaneously, the binary control signal applicable to each rate input channel of each of the two pulse rate multipliers during a straight line segment being determined the first time that rate input channel becomes operative during that straight line segment so that if the digital value of the varying function is greater than the digital reference signal when a pair of corresponding rate input channels first becomes operative during a straight line segment, a pulse output is derived from only one of the pulse rate multipliers each time that pair of rate input channels becomes operative during that straight line segment and so that if the digital value of the varying function is less than the digital reference signal when a pair of corresponding rate input channels first becomes operative during a straight line segment, a pulse output is derived only from the other pulse rate multiplier each time that pair of rate input channels becomes operative during that straight line segment, a pulse output from the one pulse rate multiplier causing the digital reference signal to increment in one direction either positively or negatively and a pulse output from the other pulse rate multiplier causing the digital reference signal to increment in the other direction so that the reference signal oscillates continually about the varying function.

The digital reference signal is preferably incremented by the same amount in both directions by the two pulse rate multipliers.

The invention includes within its scope apparatus suitable for carrying out the above method. More particularly, electrical signal processing apparatus includes at least one pulse rate multiplier including a pulse input, a pulse output and a plurality of rate input channels to which variable control signals are applicable to control the pulse output; a pulse counter connected to the pulse output of the pulse rate multiplier and operative to provide a digital reference signal; an analogue-to-digital convertor including an input to which a varying signal in analogue form is applicable and a digital output; a comparator connected to the reference signal output of the pulse counter and to the digital output of the analogue-to-digital convertor and operative to detect deviations of the digital output of the analogue-to-digital convertor from the digital reference signal output of the pulse counter; a control register connected between the output of the comparator and the rate input channels of the pulse rate multiplier; an interval counter associated with the pulse rate multiplier; and a recording memory connected to the output of the interval counter and to the digital output of the analogue-to-digital convertor, the apparatus being operative to apply control signals to the pulse rate multiplier in accordance with detected deviations of the digital output of the analogue-to-digital convertor from the digital reference signal output of the pulse counter so as continually to restore the digital reference signal output of the pulse counter towards correspondence with the digital varying output of the analogue-to-digital convertor and the apparatus further being arranged for the recording memory to register information on the varying function at each point where a deviation in excess of a predetermined maximum value is detected.

It will be appreciated that a point where a deviation in excess of the predetermined maximum value is detected, represents the end of a straight line segment and the start of the next straight line segment.

The pulse counter and/or the inverter counter and/or the control register may be integral with the pulse rate multiplier or may comprise separate units.

The pulse rate multiplier may comprise a binary pulse rate multiplier including a plurality of rate input channels to which a binary control signal is applicable.

The apparatus may be operative to program the storage of control signals in the control register for application to the pulse rate multiplier, in accordance with detected deviations of the digital output of the analogue-to-digital converter from the digital reference signal output of the pulse counter.

The comparator or associated control circuitry may be operative to determine the value of the binary control signal which is applicable to each rate input channel the first time it becomes operative after each deviation in excess of the predetermined maximum has been detected and the control register may be operative to maintain that value of the binary control signal on that rate input channel until the next deviation in excess of the predetermined maximum value is detected.

In a preferred embodiment of the invention, the apparatus comprises a pair of synchronized binary pulse rate multipliers whose rate input channels are arranged for corresponding pairs of channels to become operative simultaneously, the pulse outputs of the pulse rate multipliers being connected to a common pulse counter and at least one interval counter which is associated with the pulse rate multipliers being connected to a common recording memory; a control register for each pulse rate multiplier, each control register being connected between the output of a common comparator and the rate input channel of its own pulse rate multiplier, the arrangement being such that if the digital output of the analogue-to-digital convertor is greater than the digital reference signal output of the common pulse counter when a correspondng pair of rate input channels becomes operative the first time after a deviation in excess of the predetermined maximum has been detected, a pulse output is derived from only one of the pulse rate multipliers each time that pair of rate input channels becomes operative until the next deviation in excess of the predetermined maximum is detected to cause the digital reference signal output of the pulse counter to increment in one direction either positively or negatively and such that if the digital output of the analogue-to-digital convertor is less than the digital reference signal output of the pulse counter when a corresponding pair of rate input channels becomes operative the first time after a deviation in excess of the predetermined maximum has been detected, a pulse output is derived only from the other pulse rate multiplier each time that pair of rate input channels becomes operative until the next deviation in excess of the predetermined maximum is detected to cause the digital reference signal ooutput of the pulse counter to increment in the opposite direction.

The digital reference signal output of the common pulse counter may be arranged to increase or decrease by two steps for each pulse applied to it by either of the two pulse rate multipliers.

The recording memory may be operative to store information indicative of the instantaneous value of the varying function at each point where a deviation of the digital output of the analogue-to-digital convertor from the digital reference signal output of the pulse counter which is in excess of the predetermined maximum value is detected and also to store information indicative of the interval between the detection of successive deviations in excess of the predetermined maximum.

The recording memory may be connected to a cathode ray tube or any other suitable means operative to produce a display of the varying function as it develops.

The memory system need not be preset to record over a given period of time since the varying function itself and the capacity of the memory will determine the scale on the x-axis and the apparatus itself will tell when the memory is full. No adjustment of the so-called "time base" is required.

When a time variable function is recorded the time taken to fill the memory will depend on the information density per unit of time. Since this could vary considerably, the sum of the time intervals which are registered will also vary from function to function. An automatic time scaler may thus be required and may be added to the system. Such a time scaler will cause the sum of all the time intervals which are registered (i.e. $\Sigma \Delta t$) to cause a deflection on the x-axis of the display, which may vary between half full scale and full scale and a digital read-out may serve as an easy reference for the user.

It is an advantage of a system according to the invention that within certain limits it is not necessary to have any prior knowledge of the maximum frequency components of a varying function that has to be recorded.

BRIEF DESCRIPTION OF THE DRAWINGS

For a clear understanding of the invention, preferred embodiments will now be described by way of example with reference to the accompanying drawings in which:

FIG. 5 is a graphical representation of a straight line segment of a time varying function illustrating the manner in which the system of FIG. 4 operates.

DESCRIPTION OF THE PREFERRED EMBODIMENT

Figure 1:
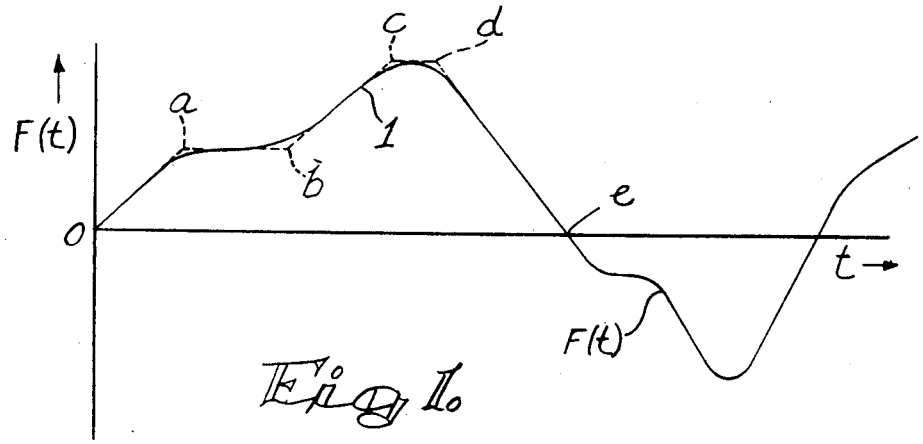
FIG. 1 is a graphical representation of a time varying function in analogue form, illustrating the manner in which the function is related to straight line segments in accordance with the invention.

As shown in FIG. 1, the time varying function F(t) which is in analogue form is related to a series of straight line segments which are located in end-to-end relationship and extend between points oa, ab, bc, cd, de .. etc. respectively. Each straight line segment closely follows a corresponding portion of the varying function F(t) and does not deviate therefrom by more than a predetermined maximum value, a straight line segment ending and the next successive straight line segment starting at each point a,b,c,d,e ... etc. where a deviation in excess of the predetermined maximum value occurs. According to the invention, only non-redundant information indicative of the co-ordinates of the points o,a,b,c,d,e,... etc. is recorded from time to time when these points are reached as the function F(t) develops.

Figure 2:
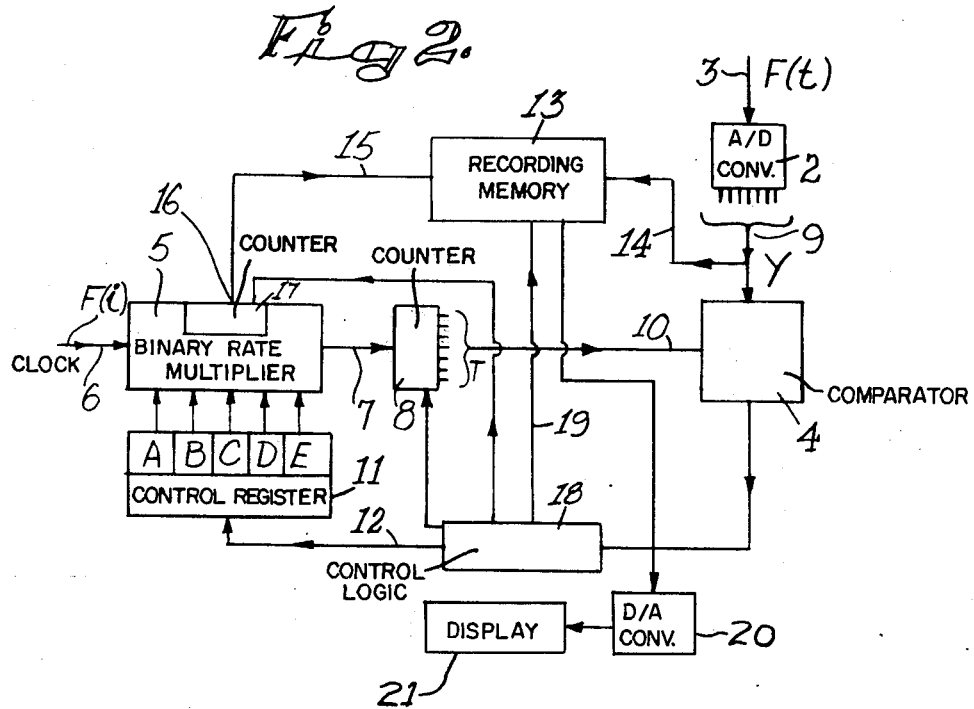
FIG. 2 is a block diagram of a basic system for carrying out the invention.

Such recording is done by means of the basic apparatus of FIG. 2 in which the time varying function F(t) is applied in analogue form via conductor 3 to analogue-to-digital convertor 2, the digital output Y of which is applied via conductor 9 to comparator 4. A series of regular clock pulses F(i) are applied via conductor 6 to binary pulse rate multiplier 5, the pulse output of which is applied via conductor 7 to pulse counter 8 to present a digital reference signal T which is applied via conductor 10 to comparator 4.

Binary pulse rate multiplier 5 has five rate input channels A,B,C,D,E to which a binary control signal is applicable by control register 11 as will be described in greater detail below. The five rate input channels become operative one at a time during successive clock pulses with successive rate input channels from most significant channel A to least significant channel E becoming operative progressively less often. If the binary control signal applied to any particular rate input channel has the value logical one during the clock pulse that channel is operative, pulse rate multiplier 5 emits a pulse which causes the digital reference signal output T of counter 8 to increment one step. If on the other hand, the binary control signal applied to any particular rate input channel has the value logical zero during the clock pulse that channel is operative, pulse rate multiplier 5 does not emit any pulses and there is no change in the digital reference signal output of pulse counter 8.

Channel A is the most significant of the five rate input channels to pulse rate multiplier 5 with the remainder of the channels becoming progressively less significant from B to E, a more significant channel becoming operative more often than a less significant channel according to the expression:

$$N = 2^{w-1}(2n+1)$$

where:

$N=$ the number of the clock pulse from the start of operations during which a particular channel becomes operative, and $n = 0,1,2,3,4$ ... etc. and $w=$ the position of the particular rate input channel in the sequence A,B,C,D,E taken from the most signficant channel A.

Thus, the most significant channel A will become operative during every second clock pulse, namely during pulses nos. 1,3,5,7 .. etc ($N=2^0(2n+1)$)

Channel B will become operative during every fourth pulse, namely during pulses nos. 2,6,10,14 .. etc. ($N=2^1(2n+1)$)

Channel C will become operative during every eighth pulse, namely during pulses nos. 4,12,20,28 ... etc. ($N=2^2(2n+1)$)

Channel D will become operative for the first time during pulse no. 8 and then during every sixteenth pulse thereafter, namely during pulses no. 8, 24, 40 ......... etc. ($N=2^3(2n+1)$).

Channel E will become operative for the first time during pulse No. 16 and then during every thirty second pulse thereafter, namely during pulses nos. 16 48, 80 .... etc ($N=2^4(2n+1)$).

Comparator 4 compares the digital output Y of convertor 2 which is dependent on the instantaneous values of the time varying function F(t), with the digital reference signal T from counter 8. When a deviation between digital output Y and the digital reference signal T is detected by comparator 4, the latter and/or associated control logic circuitry 18 transmits information in accordance with the detected deviation to control register 11 via conductor 12. Control register 11 applies appropriate values of the binary control signals which are programmed in accordance with detected deviations, to the rate input channels A,B,C,D,E, of pulse rate multiplier 5, thereby to continually cause adjustment of the digital reference signal T towards numerical equality with digital output Y, as will be described in greater detail below.

Interval counter 17 is integral with binary pulse rate multiplier 5 and the signal output of interval counter 17 appearing at 16 represents $\Delta t$.

At the start of operations, control register 11 and the output of interval counter 17 are set to zero and the digital reference signal output T of pulse counter 8 is adjusted to equality with the digital output Y of convertor 2 so that the digital signals applied to comparator 4 from convertor 2 and pulse counter 8 are equal. This is the start of the first straight line segment. In order that the reference signal T from counter 8 may follow the varying digital output Y of convertor 2 and therefore variations of the time varying function F(t), the values of the binary control signal applied to the various rate input channels A,B,C,D,E by control register 11 are programmed progressively as each rate input channel becomes operative for the first time.

If during the period during which any particular rate input channel becomes operative for the first time, there is no detected deviation of reference signal T from the digital output Y of convertor 2, logical zero remains on the rate input channel in question for as long as there is no deviation of reference signal T from digital output Y which exceeds a predetermined maximum value. Since logical zero is applied to the rate input channel in question, pulse rate multiplier 5 does not emit any output pulses and reference signal T remains unchanged during periods during which the rate input channel in question is operative.

However, if during the period any particular rate input channel becomes operative for the first time, there is a detected deviation of reference signal T from digital output Y of convertor 2, logical one is applied to and remains on the rate input channel in question for as long as there is no deviation in excess of the predetermined maximum value, so that each time the rate input channel becomes operative a pulse is emitted by pulse rate multiplier 5 to cause pulse counter 8 to increment one step and bring the digital reference signal T back towards equality with the digital output Y of convertor 2.

When a deviation in excess of the predetermined maximum value is detected, one straight line segment ends and the next successive straight line segment starts. Thus, when a deviation in excess of the predetermined maximum value is detected, control circuitry 18 causes control register 11 and the output of interval counter 17 to be reset to zero and the digital reference signal output T of pulse counter 8 to be re-adjusted to equality with the digital output Y of convertor 2, thereby to cancel the existing programming sequence and commence a new programming sequence. A new programming sequence is carried out for each successive straight line segment.

It will be appreciated that the value of the binary control signal which is applied to each rate input channel is determined during the time that rate input channel becomes operative for the first time after the detection of each deviation in excess of the predetermined maximum value and is maintained until the next deviation in excess of the predetermined maximum value is detected. In other words, the value of the binary control signal applicable to each rate input channel is determined the first time that rate input channel becomes operative during a straight line segment of the time varying function F(t) and after the value has been so determined for the input channel in question it remains the same for that rate input channel for the remainder of the straight line segment.

Recording memory 13 is connected to the digital output of convertor 2 via conductor 14 and also to the output 16 of interval counter 17 via conductor 15, as well as to control circuiting 18 via conductor 19. As stated above, the output from interval counter 17 represents $\Delta t$. The arrangement is such that each time a deviation of varying digital signal Y from reference signal T which is in excess of the predetermined maximum value is detected, control circuitry 18 causes recording memory 13 to store information indicative of the instaneous value of the time varying function F(t) at that time and also to store information indicative of the time interval from the detection of the immediately preceding deviation in excess of the predetermined maximum value. In this manner, only non-redundant information indicative of the co-ordinates of the points 0,a,b,c,d,e, .. etc. is stored. The contents of recording memory 13 may be read out to a digital-to-analogue converter 20, and the analogue voltages developed thereby are applied to a display device 21 such as a CRT.

Figure 3:
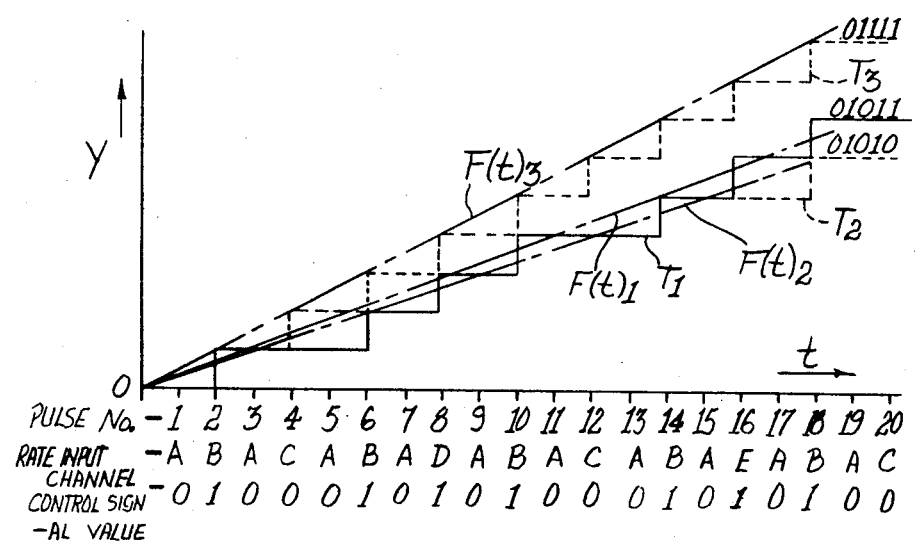
FIG. 3 is a graphical representation of different straight line segments of a time varying function having different slopes, illustrating the manner in which the invention is carried out.

For a clearer understanding of the operation of the apparatus, reference will now be made to FIG. 3 which shows along the x-axis the numbers of the clock pulses at which logical 0 and logical 1 are applied to the various rate input channels ABCDE. Assume that control register 11 is programmed in accordance with previously detected deviations of varying digital signal Y from digital reference $T_1$ so that ABCDE = 01011.

At pulse no. 1 which channel A is operative, there will be no increment in $T_1$ since A = 0. At pulse no. 2 there will be an increment of one step since B − 1. At steps nos. 3,4, and 5 there will not be any increment in $T_1$ since A as well as C = 0. At pulse no. 6 there will again be an increment of one step since B = 1. $T_1$ will develop in this manner for as long as there is no deviations between Y and $T_1$ to give a straight line segment F(t)$_1$ with a slope determined by the control signal code ABCDE=01011.

Assume now that in accordance with previously detected deviations of Y from $T_1$, the control signal value for channel E is changed from 1 to 0 so that ABCDE = 01010. The development of the digital output of counter 8 will be exactly the same as for straight line segment F(t)$_1$ until just prior to pulse no. 16. At pulse no. 16 channel E becomes operative for the first time and reference signal $T_2$ will not increment as before, but will remain the same as shown in dotted lines in FIG. 3 to give a straight line segment F(t)$_2$ whose slope is less than that of F(t)$_1$.

If now the control signal value for channel C is changed from 0 to 1 in accordance with previously detected deviations of Y from $T_2$, the development of the digital output of counter 8 will change earlier at pulse no. 4 (the first time channel C becomes operative), where reference signal $T_3$ will increment by one step as shown in dotted lines to give a straight line segment F(t)$_3$ whose slope is greater than that of straight line segments F(t)$_1$ and F(t)$_2$.

It will be appreciated from the foregoing that two straight line segments representing different slopes, will only diverge from each other at the point where the most significant rate inpupt channel whose binary control signal values differ in the control signal codes of the two straight line segments, becomes operative the first time. Thee more significant the input channel in question the earlier the divergence occurs and the greater the difference in slope of the two straight line segments.

The system according to the invention will only be able to follow sections of varying functions that can be approximated by linear functions within certain preset error limits, for the reason that when the slope changes, the digital output T of pulse counter 8 continues to develop according to the slope of the initial part of the previous slope for which the multiplier 5 has been programmed.

Any small deviations of the varying function F(t) from an ideal straight line will not influence the system as long as the system can still compensate for such deviations with any remaining rate input channels for which values in the control signal code have not yet been determined at the time of a deviation. The system becomes increasingly critical as programming progresses since the remaining unprogrammed rate input channels have a progressively decreasing influence on the slope, with the result that the permissible relative deviation in absolute value becomes smaller and smaller.

It is found in practice that the varying function F(t) does not normally correspond exactly with the digital output Y of analogue-to-digital convertor 2 at the beginning of each straight line segment to which the varying function is related. This can cause errors in the operation of the basic system described above due to the fact that reference signal T may increment either too fast or too slow so that it cannot follow digital output Y satisfactorily. The practical system of FIG. 4 may be used to avoid or at least to minimize such errors.

Figure 4:
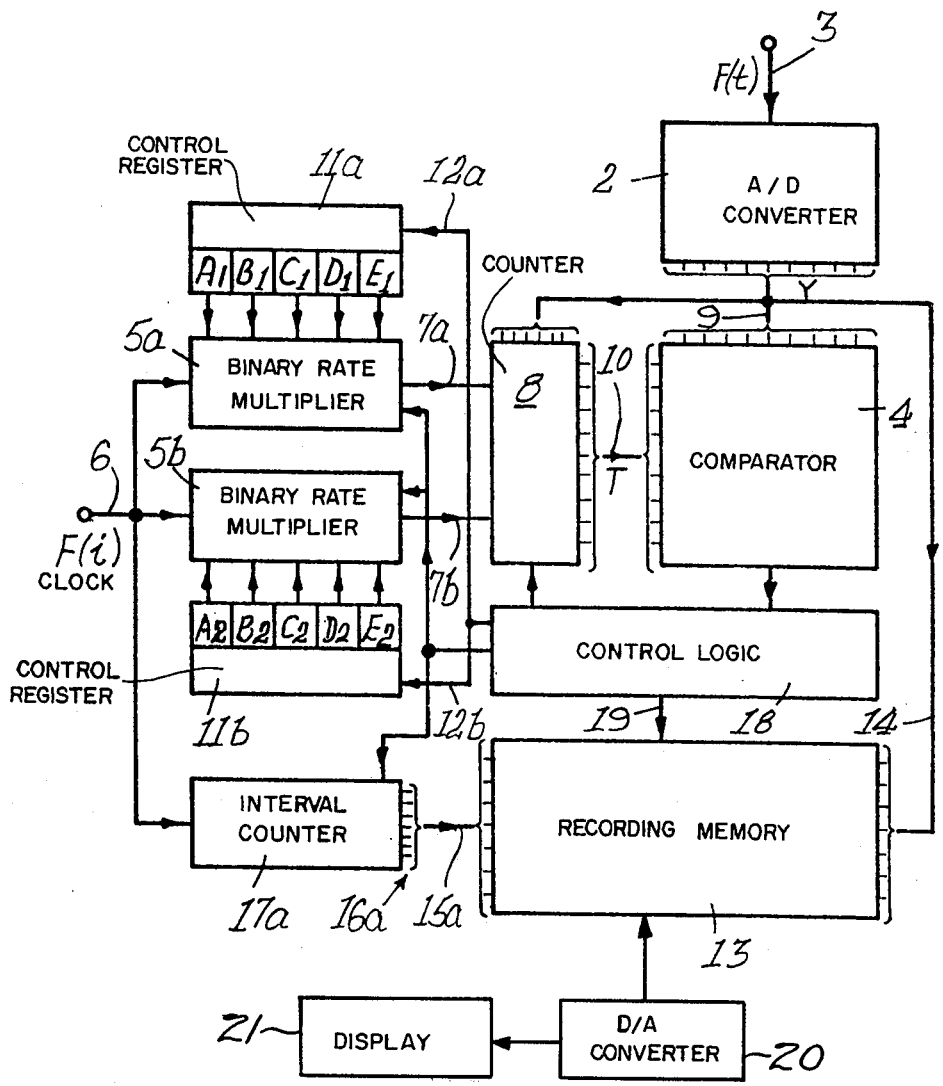
FIG. 4 is a block diagram of a practical system for carrying out the invention.

The system of FIG. 4 is basically similar to that of FIG. 2, with the exception that two synchronized binary pulse rate multipliers 5a and 5b are provided, each with its own rate input channels $A_1B_1C_1D_1E_1$ and $A_2B_2C_2D_2E_2$ respectively and its own control register 11a and 11b respectively. It will be seen that the output of common comparator 4 is connected to both control registers 11a and 11b via control logic circuitry 18 by conductors 12a, 12b respectively. The pulse outputs of the two pulse rate multipliers 5a and 5b are connected to a common pulse counter 8 via conductors 7a, 7b respectively. The two pulse rate multipliers 5a, 5b share a common interval counter 17a whose output 16a is connected to a common recording memory 13 via conductor 15a. Each time a deviation of varying digital signal Y from digital reference signal T which is in excess of the predetermined maximum value is detected, control circuitry 18 causes recording memory 13 to store information indicative of the instantaneous value of the time varying function F(t) at that time and also to store information indicative of the time interval between the detection of successive deviations in excess of the predetermined maximum value.

Synchronized pulse rate multipliers 5a, 5b are arranged for similar clock pulses to be applied to them in synchronism and for corresponding pairs of rate input channels to become operative simultaneously. In other words rate input channels $A_1$ and $A_2$ will become operative together during the same clock pulse, rate input channels $B_1$ and $B_2$ will become operative together during another clock pulse and so on. The corresponding pairs of rate input channels become operative according to the expression $N=2^{w-1}(2n+1)$ as described fully above for the basic system of FIG. 2.

As before, the binary control signal values applicable to the various rate input channels are programmed in similar manner to that described above for the basic system of FIG. 2. The binary control signal value applied to each rate input channel of each of the two pulse rate multipliers 5a and 5b during a straight line segment is determined the first time that particular rate input channel becomes operative during that straight line segment and once determined that control signal value is maintained on that rate input channel for the remainder of that straight line segment. If the digital output Y of convertor 2 is greater than the digital reference signal T from counter 8 during the clock pulse when a particular pair of corresponding rate input channels first become operative during a straight line segment, a pulse output is derived only from the one pulse rate multiplier 5a each time that pair of rate input channels become operative during that straight line segment. Each pulse output from pulse rate multiplier 5a causes counter 8 to increment its reference signal output T additively by 2 steps. If on the other hand, the digital output Y of convertor 2 is less than the digital reference signal T from counter 8 during the clock pulse when a particular pair of corresponding rate input channels first become operative during a straight line segment, a pulse output is derived only from the other pulse rate multiplier 5b each time that pair of rate input channels become operative during that straight line segment. Each pulse output from pulse rate multiplier 5b causes counter 8 to increment its reference signal output T to increment subtractively by 2 steps.

It will be appreciated that control registers 11a and 11b are programmed for two binary control signal codes, the difference between the two codes being equal to the slope H of the straight line segment under consideration. In other words:

$$\frac{\begin{array}{c}A_1B_1C_1D_1E_1\\ A_2B_2C_2D_2E_2\end{array}}{H}$$

Since the output of pulse counter 8 is adapted to increment up or down by two steps for each pulse applied to it, depending on whether the pulse is received from pulse rate multiplier 5a or 5b, reference signal T oscillates about Y as shown in FIG. 5 for the two examples $F(t)_1$ and $F(t)_2$.

The development of $T_1$ for $F(t)_1$ will now be described. Initially at t=0 the contents of control registers 11a and 11b and the outputs of pulse counter 8 and interval counter 17a are set equal to zero. Assume that at clock pulse no., 1 Y=1. Rate input channels $A_1$ and $A_2$ are both interrogated by pulse rate multipliers 5a and 5b respectively. Since both $A_1$ and $A_2$ are zero, no output pulses are produced by either of pulse rate multipliers 5a or 5b. However, since Y is greater than T (T being zero) comparator 4 is caused to program a 1 into rate input channel $A_1$, which in turn causes pulse rate multiplier 5a to produce a pulse on conductor 7a to cause T to increment 2 steps. It is to be noted that it is possible for either $A_1$ or $A_2$ to be programmed at this stage as pulse No. 1 corresponds to the point where rate input channels $A_1$ and $A_2$ operate on pulse rate multipliers 5a and 5b respectively for the first time.

After this, rate input channel $A_1$ remains 1 and rate input channel $A_2$ remains 0.

At pulse no. 2, Y has not changed and is still equal to 1. Because T=2, rate input channel $B_2$ is programmed with 1 to cause T to decrement by 2 steps. At pulse no. 3, rate input channels $A_1$ and $A_2$ come into operation again, and T becomes 2 again because $A_1=1$.

At pulse no. 4, T=Y and because this is the first time rate input channels $C_1$ and $C_2$ become operative, both $C_1$ and $C_2$ are left to be zero. Thus T remains equal to Y.

At pulse no. 5, rate input channels $A_1$ and $A_2$ become operative again so that T becomes equal to 4.

At pulse no. 6, rate input channel $B_2$ decrements T back to 2.

At pulse no, 8, rate input channel $D_2$ is programmed with 1 because T is greater than Y, and so on.

Thus after pulse no. 16 the control signal code of control register 11a is 10001 and that of control register 11b is 01010 and the difference in these two binary codes is 00111 which is a quantitized indication of the true slope of $F(t)_1$.

By inspecting FIG. 5 at pulse no. 1. and bearing in mind that for any quantitized Y value of $F(t)_1$ the instantaneous value of $F(t)_1$ may lie anywhere in the range from $Y - \frac{1}{2}$ to $Y + \frac{1}{2}$, it will be clear that if Y = 1 at pulse No. 1 the slope of $F(t)_1$ may vary between 0 and 2 (the latter value being the slope of $F(t)_2$) and that it is therefore necessary for T to increment by 2 steps for each pulse received.

It will be appreciated that many variations in detail are possible without departing from the spirit of the invention. FIGS. 2 and 4 represent the apparatus very diagrammatically for the sake of simplicity, but the operation of the complete systems and the design of the individual units will be clear to a man skilled in the art from the above description.

The above description refers to a time variable function F(t) but any other variable function F(x) may be involved. The outputs of interval counters 17a will then represent Δx.

I claim:

1. A method of processing a varying electrical function including the steps of relating the varying function to a series of straight line segments located in end-to-end relationship with each straight line segment closely following a corresponding portion of the varying function and not deviating therefrom by more than a predetermined maximum value, a straight line segment ending and the next successive straight line segment starting at each point where a deviation in excess of the predetermined maximum value occurs; and registering information on the varying function from time to time as it develops only at each point where a straight line segment ends and the next successive straight line segment starts.

2. A method as claimed in claim 1, wherein the step of relating comprises the steps of comparing the varying function with a reference signal; detecting deviations of the varying function from the reference signal; and adjusting the reference signal continually towards correspondence with the varying function; and wherein the step of registering information on the varying function is preformed at each point where a deviation of the varying function from the reference signal in excess of the predetermined maximum value occurs.

3. A method as claimed in claim 2, wherein the information on the varying function which is registered is indicative of the instantaneous value of the varying function at each point where the deviation between the varying function and the reference signal exceeds the predetermined maximum value.

4. A method as claimed in claim 2, wherein the information on the varying function which is registered is indicative of the intervals between the detection of successive deviations between the varying function and the reference signal in excess of the predetermined maximum value.

5. A method as claimed in claim 2, wherein the step of comparing the varying function with the reference signal is performed at intervals.

6. A method as claimed in claim 2, wherein the step of adjusting comprises the steps of adjusting the reference signal initially to correspond with the varying function and thereafter adjusting the reference signal continually towards correspondence with the varying function.

7. A method as claimed in claim 2, wheerein the step of adjusting comprises the steps of adjusting the reference signal towards correspondence with the varying function by the application of control signals dependent on the correspondence or deviation of the varying function from the reference signal; and continually varying the application of the control signals in accordance with detected deviations.

8. A method as claimed in claim 2, further comprising the step of converting a varying function in analogue form into digital form, the converted digital varying function signal being compared with a digital reference signal which is adjusted continually towards numerical equality with the converted digital varying function signal whenever a deviation is detected.

9. A method as claimed in claim 8, further comprising the step of generating the digital reference signal from a series of substantially uniform pulses.

10. A method as claimed in claim 9, wherein the digital reference signal is adjusted towards equality with the digital varying function signal by applying to the pulses, binary control signals dependent on the correspondence or deviation of the varying function with or from the reference signal; controlling the pulse output in accordance with the control signals; adjusting the digital reference signal in accordance with the pulse output; comparing the digital varying function signal with the digital reference signal; and applying the binary control signals in accordance with detected variations.

11. A method as claimed in claim 10, wherein a binary control signal is applied to the pulses via a plurality of input channels which become operative one at a time during successive pulses with successive input channels from a most significant channel to a least significant channel becoming operative progressively less often, a predetermined change in the pulse output being produced during a pulse when the binary control signal comprises logical one on the input channel which is operative during the pulse in question and no change in the pulse output being produced during a pulse when the binary control signal comprises logical zero on the input channel which is operative during the pulse in question.

12. A method as claimed in claim 11, wherein the input channels become progressively less significant in their influence on the pulse output by becoming operative according to the expression:

$$N = 2^{w-1}(2n+1)$$

Where:
N= the number of the pulse from the start of operations at which a particular input channel becomes operative.
n= 0,1,2,3,4 .... etc. and
w= the position of the particular input channel relative to the most significant channel in the progressive sequence of decreasing significance.

13. A method as claimed in claim 11, wherein the value of the binary control signal applicable to each input channel is determined the first time the input channel in question becomes operative during a straight line segment of the varying function and remains the same for the input channel in question during the remainder of the straight line segment in question.

14. A method as claimed in claim 11, wherein the digital reference signal is adjusted by pulse outputs from two series of pulses each of whic is controlled by a binary control signal applied via its own set of input channels, the two sets of input channels being synchronized for pairs of corresponding channels to become operative simultaneously and the binary control signal applicable to each input channel of each set during a straight line segment being determined the first time that input channel becomes operative during that straight line segment so that if the digital value of the varying function is greater than the digital reference signal when a pair of corresponding input channels first becomes operative during a straight line segment, a pulse output is derived from only one of the series of pulses each time that pair of rate inputs channels becomes operative during that straight line segment and so that if the digital value of the varying function is less than the digital reference signal when a pair of corresponding rate input channels first becomes operative during a straight line segment, a pulse output is derived only from the other series of pulses each time that pair of rate input channels becomes operative during that straight line segment, a pulse output from the one series of pulses causing the digital reference signal to increment in one direction either positively or negatively and a pulse output from the other series of pulses causing the digital reference signal to increment in the other direction so that the reference signal oscillates about the varying function.

15. A method as claimed in claim 14, wherein the digital reference signal is incremented by the same amount in both directions.

16. Electrical signal processing apparatus including at least one pulse rate multiplier including a pulse input, a pulse output and a plurality of rate input channels to which variable control signals are applicable to control the pulse output; a pulse counter connected to the pulse output of the pulse rate multiplier and operative to provide a digital reference signal; an analogue-to-digital convertor including an input to which a varying signal in analogue form is applicable and a digital output; a comparator connected to the reference signal output of the pulse counter and to the digital output of the analogue-to-digital convertor and operative to detect deviations of the digital output of the analogue-to-digital convertor from the digital reference signal output of the pulse counter; a control register connected between the output of the comparator and the rate input channels of the pulse rate multiplier; an interval counter associated with the pulse rate multiplier; and a recording memory connected to the output of the interval counter and to the digital output of the analogue-todigital convertor, the apparatus being operative to apply control signals to the pulse rate multiplier in accordance with detected deviations of the digital output of the analogue-to-digital convertor from the digital reference signal output of the pulse counter so as continually to restore the digital reference signal output of the pulse counter towards correspondence with the digital varying output of the analogue-to-digital convertor and the apparatus further being arranged for the recording memory to register information on the varying function at each point where a deviation in excess of a predetermined maximum value is detected.

17. Apparatus as claimed in claim 16, wherein the pulse rate multiplier comprises a binary pulse rate multiplier including a plurality of rate input channels to which a binary control signal is applicable and which becomes operative one at a time during successive pulses applied to the pulse rate multiplier with successive rate input channels from a most significant channel to a least significant channel becoming operative progressively less often according to the expression:

$$N = 2^{w-1}(2n+1)$$

Where:
N= the number of the pulse from the start of operations at which a particular rate input channel becomes operative.
N= 0,1,2,3,4, ...... etc, and
w= the position of the particular rate input channel relative to the most significant channel in the progressive sequence of increasing significance.

18. Apparatus as claimed in claim 16, wherein the comparator or associated control circuitry is operative to determine the value of the control signal which is applicable to each rate input channel the first time it becomes operative after each deviation in excess of the predetermined maximum has been detected and the control register is operative to maintain that value of the control signal on that rate input channel until the next deviation in excess of the predetermined maximum value is detected.

19. Apparatus as claimed in claim 16, comprising a pair of synchronised binary pulse rate multipliers whose rate input channels are arranged for corresponding pairs of channels to become operative simultaneously, the pulse outputs of the pulse rate multipliers being connected to a common pulse counter and at least one interval counter which is associated with the pulse rate multipliers being connected to a common recording memory; a control register for each pulse rate multiplier, each control register being connected between the output of a common comparator and the rate input channels of its own pulse rate multiplier, the arrangement being such that if the digital output of the analogue-to-digital convertor is greater than the digital reference signal output of the common pulse counter when a corresponding pair of rate input channels becomes operative the first time after a deviation in excess of the predetermined maximum has been detected, a pulse output is derived from only one of the pulse rate multipliers each time that pair of rate input channels becomes operative until the next deviation in excess of the predetermined maximum is detected to cause the digital reference signal output of the pusle counter to increment in one direction either positively or negatively and such that if the digital output of the analogue-to-digital convertor is less than the digital reference signal output of the pulse counter when a corresponding pair of rate input channels becomes operative the first time after a deviation in excess of the predetermined maximum has been detected, a pulse output is derived only from the other pulse rate multiplier each time that pair of rate input channels becomes operative until the next deviation in excess of the predetermined maximum is detected to cause the digital reference signal output of the pulse counter to increment in the opposite direction.

20. Apparatus as claimed in claim 19, wherein the digital reference signal output of the pulse counter increments by the same amount for each pulse applied to it by either of the pulse rate multipliers.

21. Apparatus as claimed in claim 16, wherein the recording memory is operative to store information indicative of the instantaneous value of the varying signal at each point where a deviation of the digital output of the analogue-to-digital convertor from the digital reference signal output of the pulse counter which is in excess of the predetermined maximum value is detected and also to store information indicative of the interval between the detection of successive deviations in excess of the predetermined maximum.

22. Apparatus as claimed in claim 16, wherein the recording memory is connected to display means operative to produce a display of the varying signal as it develops.

23. Electrical signal processing apparatus including at least one pulse rate multiplier including a pulse input, a pulse output and a plurality of rate input channels to which variable control signals are applicable to control the pulse output; a pulse counter connected to the pulse output of the pulse rate multiplier and operative to provide a digital reference signal; an analogue-to-digital convertor including an input to which a varying signal in analogue form is applicable and a digital output; a comparator connected to the reference signal output of the pulse counter and to the digital output of the analogue-to-digital convertor and operative to detect deviations of the digital output of the analogue-to-digital convertor from the digital reference signal output of the pulse counter; a control register connected between the output of the comparator and the rate input channels of the pulse rate multiplier; an interval counter associated with the pulse rate multiplier; and a recording memory connected to the output of the interval counter and to the digital output of the analogue-to-digital convertor; control signals being stored in the control register for application to the pulse rate multiplier in accordance with detected deviations of the digital output of the analogue-to-digital convertor from the digital reference signal output of the pulse counter so as continually to restore the digital reference signal output of the pulse counter towards correspondence with the digital varying output of the analogue-to-digital convertor and the recording memory registering information on the varying function at each point where a deviation in excess of a predetermined maximum value is detected.

\* \* \* \* \*